(No Model.)

2 Sheets—Sheet 1.

J. H. BURD.
DIRT PULVERIZER.

No. 250,199. Patented Nov. 29, 1881.

Witnesses
Geo. H. Strong.
Frank A. Brooks

Inventor
Joseph H. Burd
By Dewey & Co.
Attys

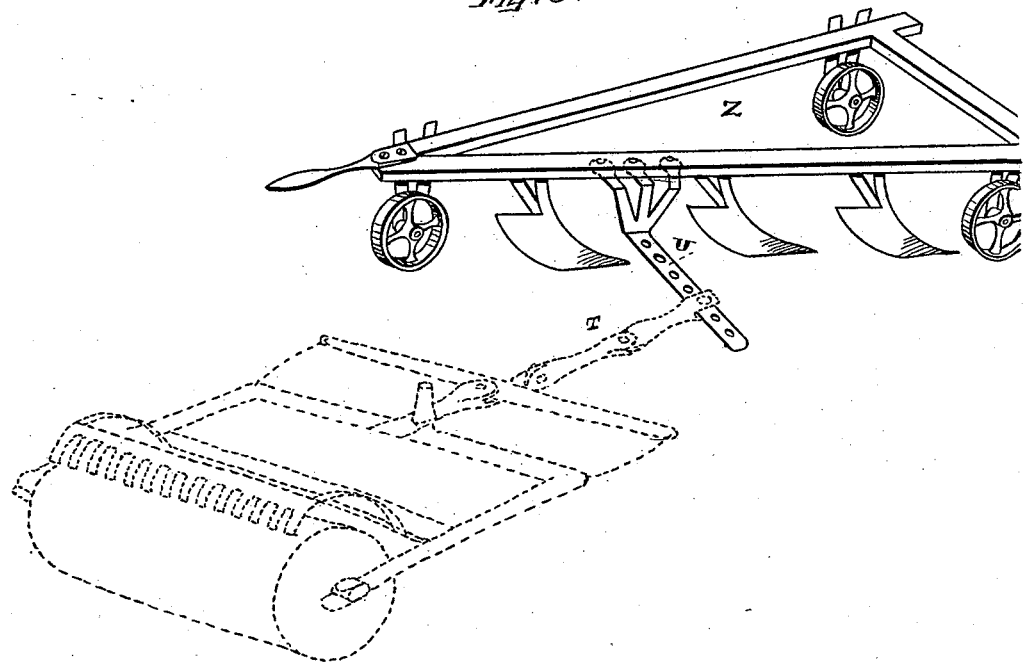

UNITED STATES PATENT OFFICE.

JOSEPH H. BURD, OF CROW'S LANDING, CALIFORNIA.

DIRT-PULVERIZER.

SPECIFICATION forming part of Letters Patent No. 250,199, dated November 29, 1881.

Application filed August 30, 1881. (No model.)

*To all whom it may concern:*

Be it known that I, JOSEPH H. BURD, of Crow's Landing, county of Stanislaus, State of California, have invented a new and useful Dirt-Pulverizer; and I hereby declare the following to be a full, clear, and exact description thereof.

My invention relates to that class of agricultural implements known as "dirt-pulverizers," the object of which is to thoroughly break up the soil to render it suitable for planting.

My invention consists of a frame-work in which is supported a secondary frame carrying teeth, said frame having a vertical adjustment by means of a lever. Following these teeth is a roller, forming the rear bearing or rolling-gear for the device. It has on its surface a number of triangular teeth, which are intended to cut up the earth which the forward teeth have smoothed and scraped. A scraper set over the roller keeps the teeth of said roller clean, and appropriate scrapers keep the teeth in front clean. Minor details of construction complete the invention. The device is intended to follow any kind of plow, being attached thereto as hereinafter shown, and being drawn by the plow so that it will pulverize the dirt turned up by the plow.

Figure 1:
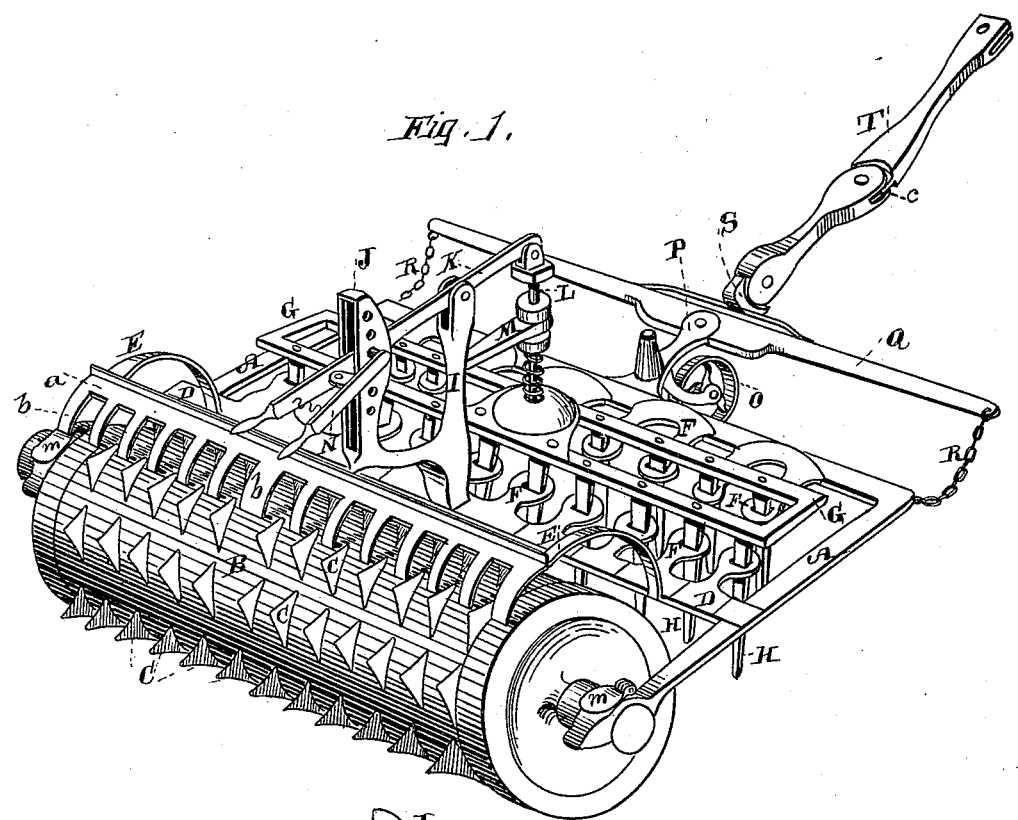
Figure 2:
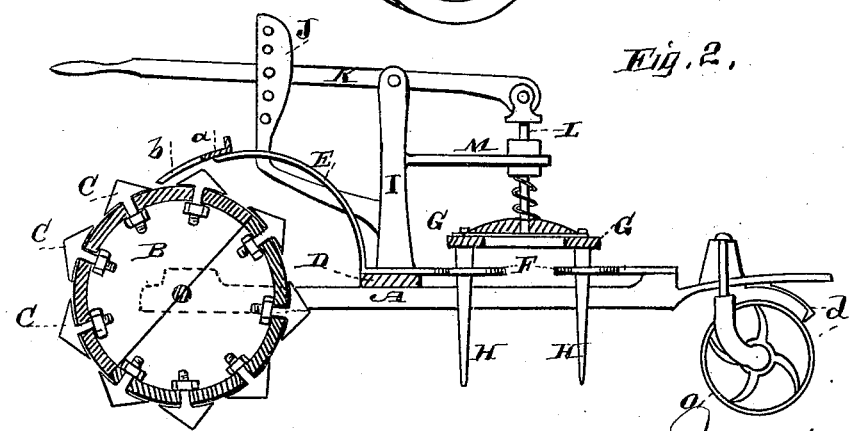

Referring to the accompanying drawings, Figure 1 is a perspective view of my dirt-pulverizer. Fig. 2 is a longitudinal section. Fig. 3 shows means and manner of connecting with plow.

Let A represent the frame of the device. Journaled in its rear ends is a roller, B. This is made hollow and in halves, each half being removable, when necessary. Over the surface of the roller are the teeth or blades C. These are here shown triangular in shape, and are arranged upon the roller in rows. These blades have shanks or stems which pass through the roller, and are fastened upon the inside by separate nuts. Each blade is therefore easily removable. The main frame A has a cross-piece, D, upon which are secured arms E, which extend upward and curve over the roller. Across their ends is a scraper, *a*, having prongs *b*, which extend down between the rows of blades C upon the roller. These keep the blades clean and prevent them from becoming clogged.

Attached to the front of the frame A, and to the cross-piece D are arms F, the ends of which have holes in them.

G represents the harrow-frame, in which are teeth H. These pass down through the holes in the arms F, which act as guides for them, and more especially as scrapers to keep the teeth clean when raised lowered.

I represents a standard upon the cross-piece D. It has a rear arm, J, which serves as a rack-bar for the lever K. This lever is pivoted in the top of the standard, and is attached at its end to a rod, L, which passes down through a guide, M, and is secured to the harrow-frame G.

N is a ratchet-lever pivoted to the lever K, and adapted to engage with the rack J in any suitable manner to hold the lever in different places. By the operation of this lever the harrow-frame G is raised or lowered to cause its teeth H to scrape shallow or deep. The perforated arms F guide the teeth and scrape them.

O represents the guide-wheel, properly journaled, and provided with a scraper, *d*, whereby it is kept clean.

Pivoted to the forward end of a support, P, in which the guide-wheel is journaled, is a guide-rod, Q, each end of which is connected with the frame A by a chain, R. When the draft is in the middle it is exerted upon the support P. When to one side, it is also exerted upon the guide-rod Q, for it turns to one side and through its end chain draws upon the side of the frame A and assists to turn the roller B.

S represents a clevis attached to the guide-rod Q, having pivoted to it the draft bar or tongue T. This tongue is hinged or jointed at about its middle, as shown at *c*. These two joints are to allow the tongue to move either way. The one where it is attached to the clevis allows a vertical movement and the other a horizontal lateral one. This is for the purpose of allowing the frame a free movement in any direction without cramping it when going over uneven ground in hollow or rolling land.

*m* represents oil-cups upon the bearings of the roller B. When traveling over the ground the teeth H scrape and smooth the earth in the usual way, and the roller with its blades cuts it up fine and pulverizes it. Pieces or clods which escape the teeth H are cut up by the roller very effectively. The scraper *a* keeps the blades clear of vegetation, &c., that they may penetrate the ground.

As before stated, the device is intended to be attached to and follow any kind of plow. Let Z represent one form of plow to which the draft is applied. Now, in order to attach the pulverizer to it, I have the connecting-bar U. This has three arms, which are bolted to the plow, as shown. It is provided with a series of holes in its main portion, in any of which the jointed tongue may be pivoted by a clevis-bolt. When the plow is working on hilly or uneven land the pulverizer would naturally not follow directly in line, but would be too much over to one side or the other. By having the bar U this may be corrected by shifting the tongue T up or down the bar U and connecting it in different holes of said bar, thus getting it in place again. There are to be different widths of these pulverizers, to conform to the widths of whatever plows they are to follow.

Having thus described my invention, what I claim as new, and desire to secure by Letters Patent, is—

1. In a dirt-pulverizer, the frame A, having perforated guide-arms F, the combination of the harrow-frame G, with its teeth H passing through the guide-arms, and the lifting-rod L, lever K, and supports I and J, substantially as herein described.

2. In a dirt-pulverizer, the combination of the harrow-frame G, with its teeth H, adjustable in the manner described, and the roller B, with its blades C, substantially as and for the purpose herein described.

3. In a dirt-pulverizer, the swinging guide-rod Q, with its end connecting chains, R, and the jointed draft bar or tongue S, having a vertical joint and a horizontal joint, as shown, in combination with the connecting-bar U, adapted to be secured to a preceding plow, substantially as and for the purpose herein shown.

In witness whereof I have hereunto set my hand.

JOSEPH H. BURD.

Witnesses:
JOHN McNISH,
FRED. ZUCKER.